Patented July 30, 1940

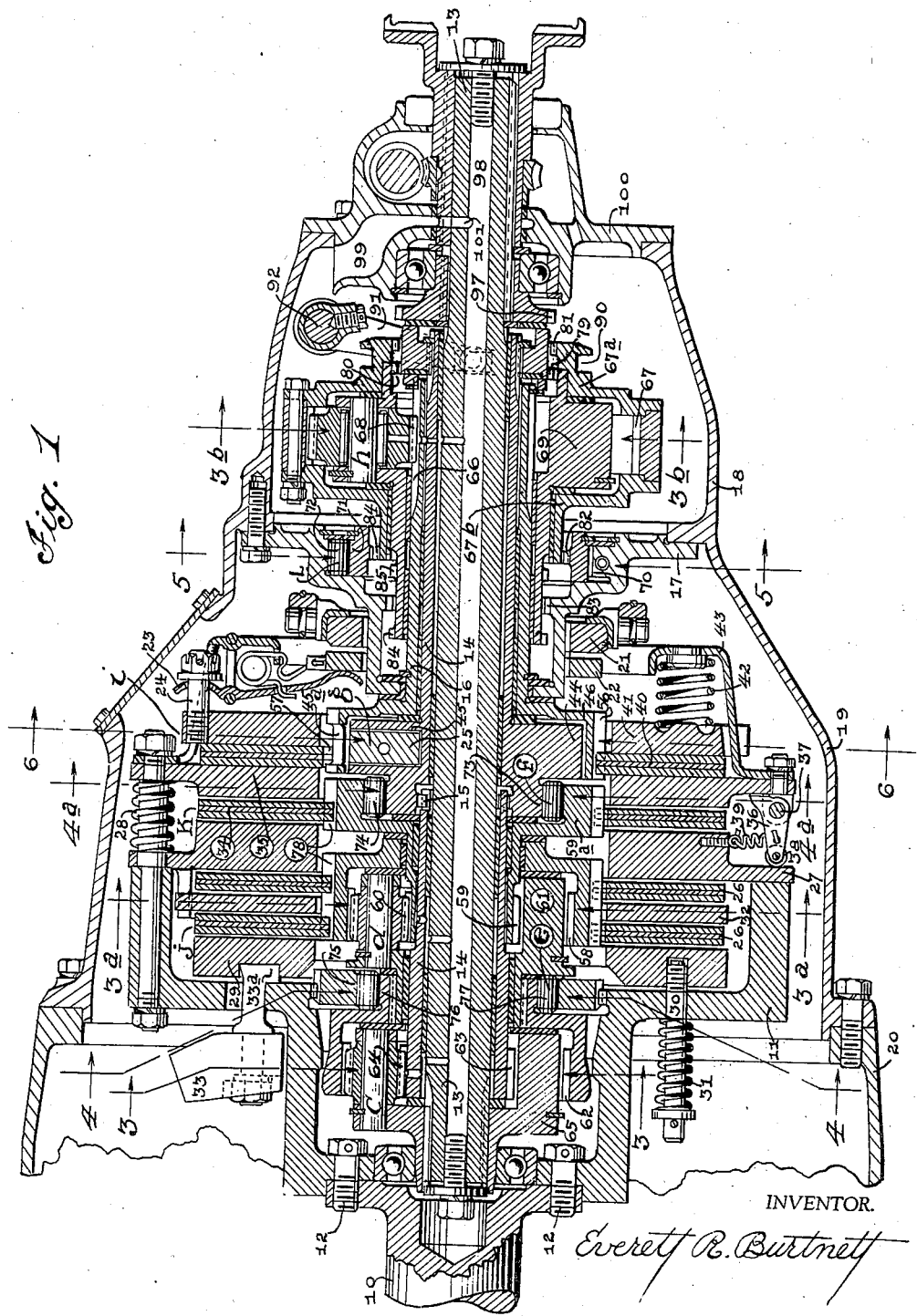

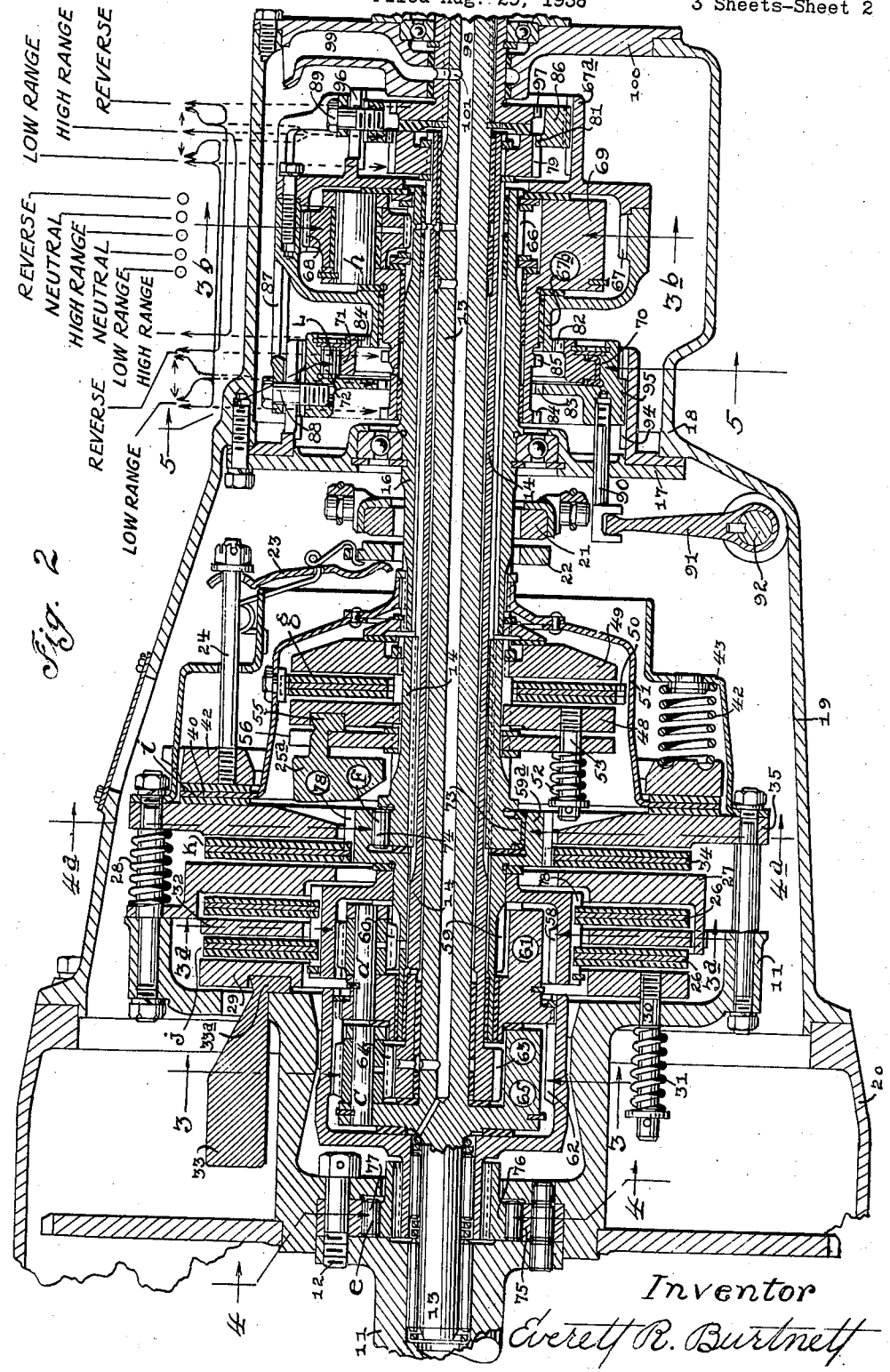

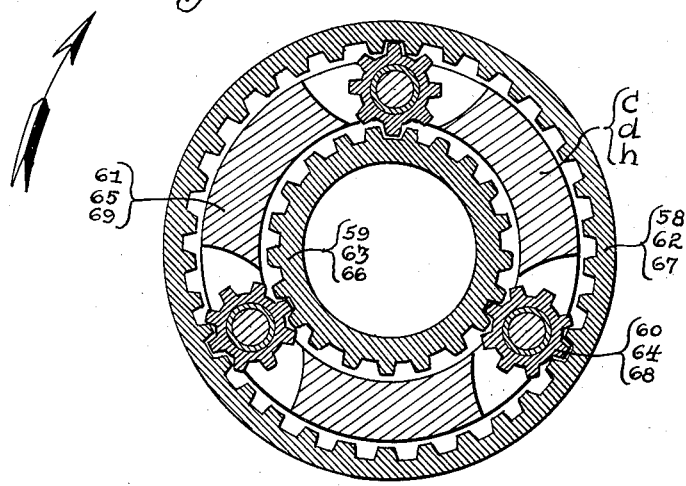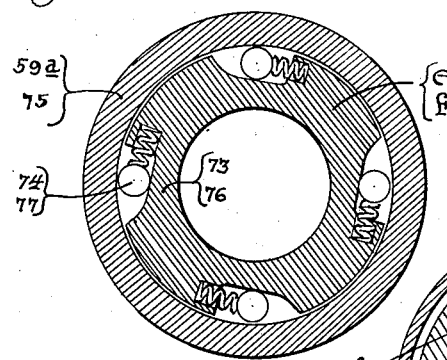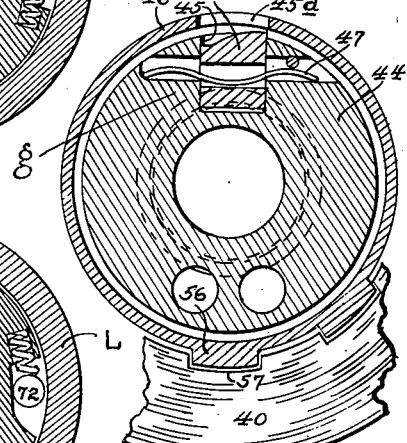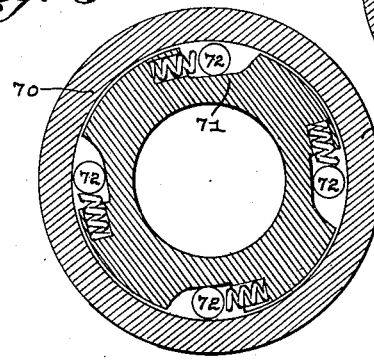

2,209,385

UNITED STATES PATENT OFFICE 2,209,385

POWER TRANSMITTING MECHANISM

Everett R. Burtnett, Los Angeles, Calif., assignor of one-half to Edith Glynn Burtnett, Los Angeles, Calif.

Application August 29, 1938, Serial No. 227,319

27 Claims. (Cl. 74—260)

This invention relates to variable speed power transmission mechanism, and more particularly to automatically variable change speed transmission mechanism especially adapted for use in motor vehicles.

A general object of the invention is to provide a transmission of the character above described embodying an automatically variable change speed transmission gearing system and a cooperating system of gearing adapted to be selectively established cooperable with the automatically variable change speed gearing whereby the latter will be established operable and such at either of different ranges of automatically variable changes of speeds.

A detailed object of the invention is to provide a combined automatically variable change speed transmission gearing and a cooperating system of gearing the latter adapted to be selectable at the will of the operator to render different ratios of opposing reaction force to the elements of the automatically variable change speed transmission gearing whereby the latter will give a different range of automatically variable speeds. In this manner providing that each different ratio of opposing reaction force will entail that the power transmitted will be shared between individual driving connections between a common power source and the respective gearings such that a multiple of simultaneous power flow lanes will function to complete the driving connections through the automatically variable change speed transmission gearing at either of the latter's gear or speed ratios. Whereby each of the lanes would share the power transmitted incurring only a portion of the power transmitted by any given power flow transmitting lane. And providing friction clutch units in certain of these power proportioned lanes for automatic engagement to complete the driving connections of different ratios which, by virtue of the reduced power ratios imposed on a given clutch unit, assures practically applied clutch capacity under automatic engaging influences such as speed responsive means with minimized slip period when the engagement is under torque.

Another detailed object of the invention is to provide a transmission as described with epicyclic transmitting gearing employable either under initial establishment for a driving connection for power torque to propel the load or under initial establishment for a driving connection for load torque to propel the power source. In the latter case such as starting a dead internal combustion engine under the influence of the load. In these respective connections the present invention contemplates the provision of means operable to initially establish a speed reducing gear drive connection for the power source (driving member) to propel the load (driven member), and the provision of an automatic speed responsive clutch mechanism for later establishing direct drive, as the successor to the speed reducing gear drive in propelling the load, operable upon a temporary reduction in the speed of the driving member relative to the driven member. Together with a one-way clutch adaptation between a gear element of the epicyclic gear train and the cooperating adaptation of the direct drive establishing automatic speed responsive clutch to establish a direct drive initially when the driving member (power source) is still under the influence of the driven member and being influenced to rotate forwardly by the load, such that the power source (internal combustion engine) could be started from motivation of the load at the same speed of the driven member which would be easier for the latter to accomplish. In the same bracket of contemplation, the present invention augments the automatic direct drive establishing means with selective means for alternatively establishing a permanent gear ratio for forward drive connecting the driven member to propel the driving member (engine) at increased speed through the medium of the epicyclic gear train and one-way clutch between an element of the latter and the driving member whereby the vehicle could be parked in gear forwardly against the engine compression as a brake.

In connection with the combination of automatically variable change speed gearing, and operator selectable variable speed gearing adapted for cooperation with the automatic gearing for propelling the load at different gear ratios, the present invention further contemplates the adaptation of the operator selectable gearing system, independent of the automatically variable gearing system, to be established to render a reversing gear drive between the driving and driven members.

In connection with the operator selectable gearing system of the present invention a further contemplation is the provision of the normally but yieldingly engaged friction clutch for individually completing the operating connections of the respective gearing system either, whereby same may contribute to the forward drives in cooperation with the automatically established variable speed gearing system, or in the alternative reversing gear drive capacity, each under control of the normally engaged friction clutch so that either the normally automatically established gear or speed ratios or the reversing gear drive or the engine starting gear or direct drive connections or connections for parking in gear would come under the influence of the normally engaged friction clutch whereby either could be temporarily disestablished, if necessary under torque, at the will of the operator exercised preferably by the customary depressing of the left foot clutch pedal to disengage the yieldingly engaged friction clutch component of all operative connections between the engine and the vehicle.

A particular object of the present invention resides in the provision of epicyclic gearing adapted to propel the load through the medium of driving the driven transmission member first at low gear ratio and later at second gear ratio. The joint provision of auxiliary gearing initially giving a proportioned gear drive from the common driving member (engine) at reduced speed to certain gear elements of the load propelling epicyclic gearing whereby other gear elements of the same epicyclic gearing are adapted to be cumulatively connected to be individually driven from the common driving member to complete circuits of low and of second gear ratio driving connections. The joint provision of a first engageable automatic speed responsive clutch adapted to cause the connection of the first of these other gear elements to be individually driven from the driving member for the establishment of low gear ratio thus through multi-lanes of power flow input to the different gear elements of the epicyclic gearing and respectively diverging initially from the common driving member whereby the low gear establishing automatic speed responsive clutch will be required only to transmit the remaining portion of the power. Hence reducing the tendency to clutch slip in initiating propulsion of the load at low gear ratio. Together with the joint provision of a second and cumulatively adapted automatic speed responsive friction clutch adapted to cause the connection of second of these other elements of the epicyclic gearing to be individually driven from the common driving member under torque (sustained acceleration of the driving member) for the establishment of second gear ratio in substitution of the low gear ratio under torque through a supplementively increased multiple of multi-lanes of power flow input to an increased number of elements of the epicyclic gearing. The provision thus proportioning only a minor share of the power to be transmitted by the secondly engaging speed responsive automatic clutch in the establishment of second gear ratio over the low gear ratio under torque. Hence reducing the tendency to clutch slip at this hitherto critical phase of automatic change speed under torque by a speed responsively energized friction clutch to a negligible maximum possibility.

Another object of the invention is the provision of a plurality of epicyclic gear trains in tandem, all for gear function to render the low gear ratio, and the elements of certain only of the plurality adapted to be connected together to leave only the remainder gear functional to render the second gear ratio. In this connection to provide a singular system or train of opposing reaction force means, connecting as a train with a respective element of each of the plurality of epicyclic gear trains, with a master one-way operable mechanism adapted as a reaction base for the opposing force train common to all epicyclic gear trains of the plurality, and with a sub-one-way operable mechanism associating said certain of the plurality of epicyclic gear trains with the common opposing force train whereby the elements of the certain epicyclic gear train may be connected together to rotate as a unit overrunning the common opposing force train and leaving the elements of the remainder of the epicyclic gear trains of the plurality free to gear function for the second gear ratio. The invention providing means establishable at the option of the operator to change the character of the opposing reaction force supplied to the second gear ratio gear functioning remainder of epicyclic gear trains of the plurality from a one-way supplied force incidental to the function of the master one-way operable device to a positive character capable of rendering the opposing reaction force in either direction rotatively, whereby the second gear ratio may be made permanent and of two-way gear drive capacity.

Still another object of the invention is to provide the reverse gear drive by forms and arrangements completely operatively circumventing the automatically variable change speed transmission mechanism, but under the individual establishing control of the normally but yieldingly engaged friction clutch, whereby the reverse gear ratio will be permanent and of fixed ratio and having two-way gear drive capacity such that it will afford a low gear ratio for parking the vehicle in gear against the engine compression as a brake against vehicle movement in either direction.

And still another object of the invention is to provide a combined automatically variable change speed and operator selectable dual range transmission wherein the entire assembly rotates as a unit in the high forward gear, and which is compact, lends to comparatively easy manufacture, light in weight but rugged and simple in its assembly, disassembly and servicing.

To this end and to others to which the invention may appertain and which will become apparent from a study of the specification and the accompanying drawings thereof, the invention consists in the novel construction and manner of arrangement, and in the combination and adaptation of the devices and parts, of the elements and as a whole as outlined herein and pointed out in the appended claims. It is understood that changes in the shape, size and proportion of the parts in minor detail and in the type of construction of the respective devices to the various detailed ends may be made, without departing from the spirit of the invention or its scope.

The invention is particularly adapted for use in motor driven vehicles and in this respect has been illustrated in the accompanying drawings, in which:

Figure 1 is a longitudinal vertical section through a transmission embodying one form of the invention;

Figure 2 is a longitudinal vertical section through a second transmission embodying another embodiment of the invention;

Figure 3 is a transverse section on either the line 3—3, the line 3a—3a or the line 3b—3b of either Fig. 1 or Fig. 2, respectively of the different lines of either Fig. 1 or Fig. 2, showing the individual of the plurality of three distinct planetary gear units of type and number preferably employed in the invention;

Figure 4 is a transverse section on either the line 4—4 or the line 4a—4a of either Fig. 1 or Fig. 2, respectively on the line 4—4 showing the one-way clutch provision between an element of the final driven planetary gear unit and the power source driving member for giving a forward rotation connection by which the engine may be started from the driven transmission shaft, and of line 4a—4a showing the individual one-way restraining or reaction clutch to the pivotal element of the first driving planetary gear unit shown on line 3a—3a, and permitting this planetary gear unit to be connected to rotate as a unit while the final driven planetary gear unit shown on line 3—3 is left open to gear drive;

Figure 5 is a transverse section on line 5—5 of either Fig. 1 or Fig. 2 showing the master one-way stop clutch or reaction brake upon which the variable speed brake mechanism gear system depends for a gear functional pivot; and Figure 6 is a transverse section on line 6—6 of Fig. 1, showing a positive type of high speed centrifugal clutch embodied in the transmission form of the invention illustrated by Fig. 1.

Referring to the drawings, a driving member, preferably representing the crank shaft of a motor vehicle engine as a power source, is indicated by 10, with a somewhat modified form of the customary flywheel 11 conventionally secured by bolts 12 to the crank shaft 10.

A single element driven transmission shaft 13 extends, from a pilot journal mounting in the usual recessed portion in the end of the power source driving member 10, to form the extreme rearwardly projecting part of the transmission, and is adapted to be coupled to the propeller shaft to propel the driving wheels of the vehicle through the usual differential gearing.

The flywheel 11 is constructed to extend rearwardly an appreciable distance with its bell-shaped hollow interior accommodating therein the planetary gear units c and d and one-way clutches e and f and high speed clutch g as a forwardly disposed assembly, all encircling the driven shaft 13 and forming the load-propelling forward-drive multi-speed system of gearing embodiment of the invention to drive the driven shaft 13 at its forward end.

Immediately encircling the driven shaft 13 is a reaction shaft 14, illustrated as being formed in two pieces rotatably connected as one by jaws 15, and extending from the radial plane of the forward planetary gear unit c to slightly beyond the radial plane of the rearmost or auxiliary planetary gear unit h. Encircling the reaction shaft 14 is an individual clutch shaft 16 for the gear unit h and adapted to be normally connected rotatably with the flywheel 11 (power source driving member) by means of the conventional clutch embodiment i of the invention.

A clutch unit j is adapted to effect the initial drive effective connection being that of connecting the larger gear of the planetary gear unit d to rotate with the flywheel 11. While a clutch unit k is adapted to engage later and effect a direct connection between the sun gear of the same planetary gear unit d and the flywheel 11, so that, consequential of the two gears of the one planetary gear unit d becoming connected to rotate with the flywheel 11, the first driving planetary gear unit d will become locked to rotate as a unit. This is permitted by the overrunning ability of the individual reaction clutch f.

A master one-way stop or reaction one-way brake device l is operatively arranged between the end wall 17 of the transmission case or housing 18 having the usual bell-shaped clutch housing portion 19 for connection to the engine block casting 20, and the variable speed auxiliary gearing system h. Different speed effective elements of the gearing h are adapted to be selectively operatively coupled to either the master one-way stop brake l or to the stationary member 17, respectively, whereby the opposing force train comprising the variable speed gearing h and the reaction shaft 14 will render different speeds of opposing force to the forward gear drive effective elements, respectively, of each of the forward driving planetary gear units c and d.

Preferably, the variable speed transmitting gearing h is driven by the flywheel 11 (power source driving member) through the medium of the clutch shaft 16 and the conventional normally engaged but optionally disengageable friction clutch i, in a manner whereby the gearing h can only function to render its opposing reaction force to the pivotal elements of the forward driving planetary gear units c and d while the clutch i is engaged. Such construction affords that any of the forward driving gear ratios may be disestablished, over their normal preselection, and regardless of the operations of the clutches j and k, by the operator exercising his will to disengage the clutch i.

The sub-one-way opposing force clutch f, individual to the first forward driving planetary gear unit d, and the master reaction one-way restraining brake l, jointly afford that the forward gear ratios of the planetary gear units c and d are adapted to free-wheel operate upon the torque being reversed through the transmission, such as would occur if the driving member 10 was decelerated. This overrunning or free-wheel operation on a reverse of torque with respect to the planetary gear unit c is dependent upon the auxiliary planetary gear unit h being in selected cooperation with the master brake l. In the event the gear unit h is instead selected directly cooperative with the stationary member 17, the elements of the planetary gear unit d may be locked to rotate as a unit by the cumulative engagement of the clutch k, overrunning the reaction shaft 14 at the secondary one-way clutch f. But the planetary gear unit c will be retained positive gear drive operative by virtue of the fixed reaction of the stationary member 17 operating through the gear unit h. So that, the positive selected establishment of the gear unit h directly with the stationary member 17 will effect the gear unit c to two-way gear drive. This feature affords an effective engine compression brake gear drive through the gear unit c from the vehicle momentum when the clutches j and k are engaged. The illustrated design of the present invention preferably contemplates the adaptation of these clutches j and k to be automatically engaged respectively, first clutch j and later clutch k in response to stepped predetermined speeds of rotation by the flywheel 11 (power source driving member). This renders the gear unit c dependent upon some other coupling means, when connected for positive (two-way gear) drive, in order to transmit rotation of the load influenced driven transmission shaft 13 to the driving member 10 (engine). To this end the one-way clutch provision e suffices.

By virtue of the clutches j and k being adapted for automatic engagement only when the speed of the driving member 10 and connected flywheel 11 is sufficient, the driver will have only occasional need to disengage the clutch i. Accordingly I show the simpler and lower cost means comprising the carbon thrust block 21, engageable thrust disk 22 and cooperating throw-out fingers or levers 23, the latter operating through bolts 24 to serve as a disengaging means under control of the driver to open the clutch $i$ at will. Preferably, the usual left foot clutch pedal (not shown) would be retained for the actuation of the thrust block 21, so that temporarily rendering the transmission in neutral (freeing the engine from the car) at any time under any speed drive, forward or reverse, and regardless of speed responsive automatic clutch engagements would result of depressing the clutch pedal. This retaining of the normally spring engaged friction clutch, for manual disengagement, and to complete the circuit of driving connections, in conjunction with speed responsive automatic clutch mechanism embraces a principal object of the present invention, particularly with a view to safety control.

The high speed clutch $g$ is preferably arranged operatively between the all speeds associate optionally disengageable friction clutch $i$ and the opposing force transmitting train as represented by the reaction shaft 14. So disposed, this high speed effective clutch $g$ may be rendered ineffectual over its high speed coupling function by disengagement of the clutch $i$. Preferably, I adapt this high speed effective clutch $g$ also to be speed responsively automatically engaged. Advantageously, it can be made responsive to speed of the reaction shaft 14, with the object of affording that the gear drive, in effect immediately under the ratio of the high speed, may be retained as the drive as long as desired by the driver maintaining the driving member 10 (engine) constantly under acceleration sufficient to keep the power flow toward, i. e., in propulsion of the driven transmission shaft 13, which means in turn the vehicle. It being understood that under torque flow propelling the load of the driven shaft 13, the reaction shaft 14 will be maintained reacting against the one-way stop brake $l$ at whatever the selected gear ratio of the auxiliary gear unit $h$. The reaction shaft 14 only enabled to attain sufficient speed, as would be required to cause automatic engagement of the high speed clutch $g$, upon the driving member (engine) being momentarily decelerated, with resultant reverse of torque flow and the driven shaft 13 tending to drive the driving member through the gear units $c$ and $d$. By which reverse of torque, the reaction shaft 14 would be caused to accelerate to an abnormally high speed.

Accordingly, a centrifugal weight clutching element 25 is provided with the clutch $g$, in the transmission form illustrated by Fig. 1, and a centrifugal weight element 25a is provided to energize engagement of the clutch $g$ form shown in Fig. 2. The engaging (actuatable) clutching element in either form, preferably arranged rotatable with the reaction shaft 14.

At this point it is thought opportune to disclose that a further object of the invention resides in the provision and arrangement of the high speed effective centrifugal automatic clutch $g$, that is adapted responsive to a reverse of torque, in series with the normally engaged but optionally disengageable friction clutch $i$. For in this combination resides the performance phenomena to wit: that once established in high speed by the automatic engagement of the clutch $g$, the transmission may be reverted to drive through the mobilized driving connections of one of the undergear ratios without cessation of torque, by the driver simply momentarily disengaging the clutch $i$ with an accompanying sufficient acceleration of the driving member 10 (power source) to maintain the torque flow toward the driven shaft 13 at the succeeding lower speed ratio of drive. The instantaneous result being the reversion of the reaction shaft to its retrograde rotative tendencies and its consequent deceleration whereby the high speed clutch $g$ will become disengaged, permitting the clutch $i$ to be reengaged. Return to the high speed being obtainable again by repetition of the act of momentarily decelerating the driving member 10 (power source). That such a flexible and driver-option, but automatic means, for alternating between an undergear and the high speed ratios, as these provisions in the present invention provide, would render a very great improvement in motor vehicle operation is obvious.

In general the construction of both forms of transmission embodiments of the invention as illustrated by Figures 1 and 2 include, driven clutch disks 26, a temporary bottom pressure or intermediate driving clutch plate 27 rotatable with the flywheel 11 and disposed behind the disks 26 and yieldingly urged forwardly to a normal position of predetermined resistance to rearward clutch engaging thrust by retractive springs 28; a first driving presser plate 29 rotatable with the flywheel 11 and disposed ahead of the disks 26 and normally retracted to occupy a forward position at rest by means of bolts 30 and retractive springs 31 acting upon these bolts with the flywheel 11 acting as a reaction member to these springs 31; an intermediate driving clutch plate 32 rotatable with the flywheel 11 and disposed between the driven disks 26; centrifugal weights 33 carried in rotation with, and so as to be responsive to the speed of, the flywheel 11 (power source driving member); with feet portions 33a of the weights 33 operatively wedged between the flywheel 11 and the presser plate 29. All constituting the primary or master driving member speed responsive automatic clutch $j$, forming the firstly engageable automatic clutch and adapted to initiate a low speed drive through the transmission by establishing an input of forward rotative efforts to the planetary gear unit $d$, supplementive to the indirect drive of the train comprised of the clutch $i$, shaft 16, gear unit $h$ and shaft 14 to respective gears of both gear trains $c$ and $d$.

Upon the springs 28 yielding to a sufficient pressure of clutch engagement in the clutch $j$, as produced by the weights 33, and upon the arm 36 swinging radially outward, the temporary bottom pressure plate 27 of the clutch unit $j$ will come into play as a driving presser plate to the secondarily engageable driving member speed responsive automatic clutch unit $k$. The latter unit comprising a driven clutch disk 34 adjacent and engageable from the front by the plate 27, a longitudinally fixed main driving bottom pressure plate 35 rotatable with the flywheel 11 and a speed responsively operable timer comprising a bell crank 36 (shown in Fig. 1 only) pivoted by a pin at 37 to the plate 35 and carrying a roller 38 tracking upon the plate 27 with a spring 39 tending to maintain the crank 36 in its normally retracted position of rest. This timer device having the crank 36 as its principal component forms means by which the crank 36 positively prevents the plate 27 from being actuated, under urge of the centrifugal weights 33, toward the clutchable disk 34, even though the springs 28 would permit, until a sufficient speed has been attained by the flywheel 11 at which the weights 33 will have sufficient centrifugal force to energize immediate engagement of the clutch unit k, so that the latter's slip period will be practically nil. Centrifugal force concentrated in the arm portion of the bell crank 36, which acts as a spacer between the plates, is depended upon to overcome the spring 39 at the desired predetermined speed of the flywheel 11, at which moment the first automatic change speed transition in the transmission is desirable and, at which the aforementioned sufficient centrifugal force prevails to immediately effect engagement of the clutch k.

Augmenting the bottom pressure plate 35 and to the rear thereof is a driven clutch disk 40 rotatable with the clutch shaft 16, a driving presser plate 41 rotatable with the flywheel 11, the usual conventional clutch springs 42 urging the presser plate 41 to clutch pack the disk 40 forwardly against the plate 35, which latter also serves as a bottom pressure plate to the disk 40; and the usual back plate or clutch shell 43, secured to the flywheel 11 and sustaining the springs 42. All constituting the heretofore referred to conventional normally engaged but optionally disengageable clutch cooperating with the auxiliary variable speed gearing h and in series with the high speed effecting automatic clutch g. The hereinbefore described throw-out fingers 23 cooperating with the bolts 24 are operable to disengage this clutch i by virtue of the bolts 24 being threaded into apertures provided therefor in the presser plate 41, and through the medium of which, actuation by the driver of the thrust bearing part 21 against part 22, effects the release or disengagement of the clutch i.

In the transmission form illustrated by Fig. 1, the high speed clutch g embodies a positive type centrifugal clutch requiring that the engaging and engageable parts thereof reach synchronism before their engagement can take place. A suitable form of this type of clutch comprises a carrier portion 44, preferably integral and rotatable with the reaction shaft 14 with the clutching centrifugal weight element 25 normally retained in the slot 45 provided and adapted to act as a guide therefor and whereby the weight 25 can move radially outward to engage into a mate slot 45a formed for same in the bell-shaped portion 46 of the clutch shaft 16.

Referring to Fig. 6, a spring 47 operates to normally maintain the weight 25 in a fully retracted radially inward position out of engagement. Upon the carrier 44 attaining a sufficient speed of rotation with the reaction shaft 14, and when the parts 25 and 46 reach synchronism such that the engageable clutch slot 45a is in line with the engaging weight element 25, the spring 47 will yield and the clutching weight element 25 will enter the slot 45a and thereby lock the reaction shaft 14 and in turn the sun pinion gear element of both the forward driving planetary gear units c and d to rotate with the flywheel 11, through the intermediary medium of the clutch i, provided the latter is left engaged.

In the transmission form illustrated by Fig. 2, the same purpose as met by the positive type clutch g of the transmission form illustrated by Fig. 1, is met by a friction type clutch. A suitable form of this friction clutch comprises presser and bottom pressure plates, respectively, indicated by 48 and 49, both rotatable with the reaction shaft 14, a driving clutch disk 50 suspended from a bell-shaped portion 51 of the driven clutch disk element 40 of the clutch unit i. The disk 50 being disposed to be clutch packed between the plates 48 and 49. With retractive springs 52 operating through the medium of bolts 53 to normally hold the presser plate 48 forwardly in a position at rest out of engagement with the disk 50, and centrifugal weights 25a mounted rotatable with the reaction shaft 14 and for actuating the presser plate 48 into engagement with the disk 50 by having feet portions 55 operatively wedged between the presser plate 48 and a longitudinally fixed back plate 56 the latter also rotatable with the reaction shaft 14.

These different forms of high speed clutches g, respectively, of the transmission forms illustrated by Figures 1 and 2, operate with similarity, except that the engaging parts 25 and 46, in the case of the positive type clutch g illustrated by Fig. 1, must reach synchronism to engage; whereas, the friction parts 48, 49 and 50 of the friction clutch g illustrated by Figure 2 are not so restricted.

Lugs 56 are formed on the bell-shaped portion 46 of the clutch shaft 16, in the transmission form illustrated by Fig. 1, and corresponding slots 57 are formed in the bore of the clutch disk 40 whereby the latter is caused to rotate with the clutch shaft 16. In the transmission form illustrated by Fig. 2, the clutch disk 40 extends into direct rotatable connection with the normal diameter of the clutch shaft 16.

The planetary gear unit d comprises an internal (annulus) gear 58 carrying the clutch disks 26 of clutch unit j, a sun gear 59 acting as the individual gear drive pivotal or opposing force reaction gear element of the respective planetary gear unit and has a portion 59a carrying the clutch disk 34 of the clutch unit k and forming the annulus of the sub-one-way opposing transmitting clutch unit f by which latter the respective planetary gear unit is provided with one-way opposing force to gear drive and is permitted to be locked to rotate as a unit by the clutch k, and a set of planet gears 60 meshing with both the internal gear 58 and the sun gear 59 and carried by a driven member 61 individual to the planetary gear unit d and rotatable with the internal gear 62 of the planetary gear unit c. By this arrangement, the internal gear 58 is first connected by the clutch j to rotate with the flywheel 11, whereupon the planet gears 60 tend to rotate the sun gear 59 relatively retrograde with respect to the driving internal gear 58. The sun gear 59 being restrained from rotating retrograde by the one-way reaction clutch f, resulting in the planet carrier 61 being driven in the same direction as the flywheel 11 but at relatively reduced speed.

The planetary gear unit c comprises the internal (annulus) gear 62, a sun gear 63 preferably integral with the reaction shaft 14 so as to act as the individual opposing force or gear drive pivotal element of the gear unit c, and a set of planet gears 64 meshing with both the internal and sun gears 62 and 63 and mounted rotatable on a carrier 65, the latter to rotate with, but preferably detachably secured to, the driven transmission shaft 13.

The planetary gear unit h preferably comprises a sun drive gear 66 rotatable with the clutch shaft 16, through the medium of which latter and the associated normally engaged clutch i, the gear 66 is normally connected rotatably with the flywheel 11 and in turn the power source shaft 10, an internal gear 67, and a set of planet gears 68 mounted rotatably on a carrier 69 and meshing with both the gears 66 and 67.

The master reaction one-way stop brake *l* preferably comprises an annulus 70 stationary with the transmission housing 18 through the medium of the wall 17, a cammed hub element 71 suspended from the annulus 70, and roller brake members 72 acting between the annulus 70 and hub 71.

The secondary, sub-reaction or one-way opposing force clutch *f* preferably comprises the annulus 59a, a cammed hub element 73 rotatable with the reaction shaft 14, and roller clutch members 74 acting between the annulus 59a and hub 73. While the one-way clutch *e*, for one-way driving the power source driving member 10 comprising shaft 19 and flywheel 11, comprises an annulus 75 rotatable with the driving member embodiment of parts 10 and 11, a cammed hub 76 rotatable with the internal gear 62 of the final forward driving planetary gear unit *c*, and roller clutch members 77 acting between the annulus 75 and the hub 76.

Splines 78 are formed on the internal gear 58 by which the clutch disks 26 of the clutch unit *j* drive same. Similar splines 78 are formed on the periphery of the one-way reaction clutch annulus portion 59a of the sun gear pivotal element 59, whereby the clutch disk 54 of the secondary clutch *k* may drive same.

In the transmission form of the invention illustrated by Fig. 1, a series of clutch teeth 79 are fixed with the reaction shaft 14. For longitudinally shiftable selective engagement with these clutch teeth are corresponding clutch teeth 80 on the planet carrier 69 of the gear unit *h*, and corresponding clutch teeth 81 on the rearward reduced diameter portion 67a of the internal gear 67.

Within the bore of the element 71 of the master reaction brake device *l*, in the case of both forms respectively as illustrated either by Fig. 1 or Fig. 2, are internal clutch teeth 82. While positive clutch teeth 83 for alternative engagement are formed on the stationary member 17.

Clutch teeth 84 are formed on the forward reduced diameter portion 67b of the internal gear 67 for engagement (as illustrated) with the clutch teeth 82, whereby the internal gear 67 is positively prevented from rotating backwards, the planet carrier 69 is driven forward at substantially 4:1 reduced speed relative to the driving speed of the sun gear 66 from the flywheel 11 (power source) through the normally engaged clutch *i* and intermediary transmitting clutch shaft 16. Hence in this selection of the gear system *h*, the reaction shaft 14 will normally be driven forwardly at substantially 4:1 reduced speed relative to, but under indirect drive from, the power source driving member 10 through the gearing system *h*. This constitutes the high range selection of forward gear ratios by the gearing system comprising the gear units *c* and *d* respectively under control of the automatic clutches *j* and *k*. In this high range selection, the one-way brake operating limitations of the device *l* renders the gear driving by the units *c* and *d* free-wheeling or adapted to overrunning whenever it is the tendency of the driven transmission shaft 13 to rotate forwardly faster than the respective gear ratio through the gear units *c* and *d*, relative to the speed of the driving member 10. In this high range selection therefore, the reaction shaft 14 is adapted to be accelerated as a reaction to any overrunning tendency of the driven shaft 13, such as would take place in the event the driving member 10 was allowed to decrease in speed while either one or both of the clutches *j* or *k* were engaged. Under this adaptation for a reverse of torque to cause acceleration of the reaction shaft 14, the high speed effective clutch *g* being rotatable with the reaction shaft 14, is adapted to be centrifugally engaged as a result of temporary reduction in speed of the driving member 10 relative to the driven member 13. Accordingly, in the high range, engagement of the clutch *j* is adapted to initiate the drive to pick up the load of the driven member 13 at a comparatively fast low speed gear ratio through the gear units *d* and *c*. Subsequent cumulative engagement of the clutch *k* is adapted to lock the planetary gear unit *d* to rotate as a unit, leaving only the gear unit *c* gear functioning, whereby the transmission is caused to undergo a speed change transition upward from low to intermediate gear ratio automatically upon the driving member 10 attaining a second predetermined speed of rotation and without necessarily incurring a cessation of power. And at any desired attained vehicle speed by the driver momentarily allowing the driving member 10 (engine) to decelerate, resultant engagement of the clutch *g* will operate to lock the reaction shaft 14 rotatable with the driving member embodiment of shaft 10 and flywheel 11. This event, supplementary to the engaged states of clutches *j* and *k*, will operate to lock the planetary gear unit *c* also to rotate as a unit, whereby the transmission is changed to the high speed ratio (direct drive).

Returning to the system of gearing *h*, corresponding and for selective engagement with the positive stationary clutch teeth 83 are found two series of longitudinally spaced clutch teeth 84 and 85, both formed on the forwardly extending hub portion 67b of the planet carrier 69.

In the transmission form illustrated by Fig. 1, the planetary gear unit assembly *h*, with the exclusion of the sun gear 66, is adapted to be shifted longitudinally whereby, either the clutch teeth 84 or the clutch teeth 85, respectively, by opposite shifting of the unit *c*, may be selectively brought into engagement with the stationary clutch teeth 83. But in the transmission form illustrated by Fig. 2, the planetary gear unit *h* is adapted to remain longitudinally in one position. The master reaction brake device *l* being adapted to be shifted longitudinally instead, with a jaw clutch member 86 carried rotatable with the internal gear 67 and adapted longitudinally shiftable with the reaction device *l*, by means of a connecting arm 87, fastened, respectively, to the reaction device *l* and to the clutch member 86, by cap screws 88 and 89. In Fig. 1 a groove 90 is provided in the rearward reduced diameter portion 67b of the internal gear 67 and adapted to receive the bifurcated ends of a shifter crank 91 which is in turn secured to a transverse actuating shifter shaft 92. By this means the gear unit *h* of this transmission form illustrated may be shifted. While in Fig. 2, a rod 90 is threaded into the shiftable annulus member 70, extending therefrom forwardly through the wall 17 into operating connection with a shifter crank 91 which is in turn secured to a transverse shifter shaft 92. By this means the reaction device *l* and positive clutch teeth 83 therewith of this transmission form are adapted to be shifted in stationary relation with the housing 18 through splines 94 and 95 provided to this end respectively on the wall 17 and the annulus 70. While at the same time the clutch member 86 is shifted but maintained rotatable with the internal gear 67 by means of the cap screw 89, operating through a slot 96 formed in the hub portion 67a of the internal gear 67, incidental to the connection of the screw 89 with both the shifter arm 87 and the clutch member 86.

Clutch teeth 97 are provided rotatable with the driven transmission shaft 13, and are adapted to be engaged by the clutch teeth 81 of the internal gear 67 by a rearward shift from the high forward range position in which the described shiftable mechanism is illustrated. By this shift, the positive stationary clutch teeth 83 will be engaged with the clutch teeth 84 of the planet carrier of the gear unit h. While the teeth 81 will be taken out of engagement with the clutch teeth 79 of the reaction shaft 14. By this rearward shift, the gear unit h will be established as a reversing transmission unit between the clutch shaft 15 and the driven shaft 13.

Providing a lubrication supply all along the axis line to the various gear units and friction parts is a drilled duct 98 in the driven shaft 13, with a reservoir 99, preferably formed in the detachable end 100 of the transmission housing 18, and having a gravity duct communication as indicated by 101 with the duct 98.

High range of forward speeds selection

In the transmission form illustrated by Fig. 1, the high range of variable forward speeds is selectable by establishing the internal gear 67 of the auxiliary variable speed gearing system h in one-way stop or nonretrograde rotative brake relation with the stationary wall 17 through the medium of the master one-way stop device l. This is effected by the clutch teeth 84 of the internal gear 67 being engaged with the clutch teeth 82 of the cammed hub 71 of the one-way stop device l. The intermediate shift position of the gear unit h, in which it is illustrated. In this selection the planet carrier 69 of the gear unit h is connected to forward drive the reaction shaft 14 as afforded by the engagement of the clutch teeth 80 of the planet carrier 69 with the clutch teeth 79 of the reaction shaft 14. Under the forward drive of the sun gear 66, from the power source driving member embodiment of shaft 10 and flywheel 11, normally in effect through the medium of the spring engaged clutch i and connecting clutch shaft 14, the internal gear 67, being prevented from rotating backwards, operates as a stationary reaction gear element causing the planet gears 68 to drive their carrier 69 forwardly at substantially 4:1 reduced speed relative to the speed of the primary driving member 10. Through the medium of the reaction shaft 14, and the individual one-way clutch j, the individual sun gear 59 of the planetary gear unit d is driven forwardly at the same 4:1 reduction, and the individual sun gear 63 of the planetary gear unit c is driven forwardly at the same 4:1 reduction, but directly by the reaction shaft 14. This forward driving of what is customarily the reaction elements themselves of the load-propelling forward driving planetary gearing operates to lessen the number of teeth respectively of the individual reaction gears 59 and 63 respectively of the two forward speed reduction gear units d and c through which the planet gears 60 and 64 respectively of these gear units d and c may track in rendering their respective speed reductions for the forward drive of the load. In other words, the slow speed forward driven rotation of the pivotal gears 59 and 63, under drive of the clutch i indirectly through the auxiliary gearing system h, augmenting the normal driven speeds of rotation of the internal gears 58 and 62 under drive of the clutch j or clutches j and k jointly, of the respective gear units d and c, will have the effect of lessening the speed reduction effect of the gear units d and c over that they would normally give if their pivotal gears 59 and 63 were held stationary against their characteristic retrograde rotative tendencies, such as practiced in speed reducing planetary gearing applications heretofore. Hence, the term high speed range properly applies to the results obtained from the selected forward drive action of the variable speed gearing system h of the present invention, when the gear unit h is selected for forward driving against retrograde rotative tendencies of the pivotal elements of the load propelling planetary gear units, as just described.

With reference now to the transmission form illustrated by Fig. 2, the high range is established by shifting the annulus 70 of the master reaction system l into an intermediate of longitudinally shiftable positions, in which it is illustrated. A difference resides in this form over that illustrated by Fig. 1, in that the high range selection of the latter establishes the planet carrier 69 operable to forward drive the reaction shaft 14 under the influence of a no-back establishment of the internal gear 67; whereas, in this form (illustrated by Fig. 2) the high range selection similarly brings the clutch teeth 84 into engagement with the clutch teeth 82 establishing the internal gear 67 in connection with the no-back device l, but also brings the clutch teeth 81 into engagement with the clutch teeth 79, establishing the internal gear 67 in direct connection with, and whereby it directly prevents, the reaction shaft 14 from rotating backward. Accordingly, the high speed range of this form illustrated by Fig. 2 provides a stationary one-way stop to the reaction shaft 14; whereas, the high speed range of the form illustrated by Fig. 1 provides a reduced speed forward drive to the reaction shaft 14. Therefore, with the same size gear embodiments making up the gear units c and d, higher speed ratios of forward gear would result of the gear units c and d from the high speed range form illustrated by Fig. 1 than from the high speed range form illustrated by Fig. 2. The diverse arrangement of the brake gearing systems h, facilitating obtaining different speed ratios constituting a high speed range, from the same gears forming an embodiment of the gear units c and d, by the form illustrated by Fig. 2 over the high speed range form illustrated by Fig. 1, could prove very advantageous to manufacturers, in that they could provide transmissions all of the same gearing production, but offer different speed ratios in the respective ranges by the simple means of altering the adaptations of the various elements of the auxiliary gearing system h, respectively, in control of reaction shaft 14.

Low range of forward speeds selection

With reference first to the transmission form illustrated by Fig. 1, for obtaining a lower speed range of variable forward speeds from the same gear units d and c, the gear unit h is shifted forwardly, out of the position in which it is illustrated, taking the pivotal clutch teeth 84 of the internal gear 67 out of engagement with the one-way stop clutch teeth 82; taking the forward brake driven clutch teeth 80 of the planet carrier 69 out of engagement with the reaction transmitting clutch teeth 79 of the reaction shaft 14; bringing the pivotal clutch teeth 85 of the planet carrier 69 into engagement with the positive two-way stop clutch teeth 83 of the stationary member 17; and bringing the reverse brake driven clutch teeth 81 of the internal gear 67 into engagement with the clutch teeth 79 of the reaction shaft 14. Under forward drive of the normally engaged clutch i, the sun gear 66 of the brake effecting gear unit h now operates, by virtue of the planet carrier 69 being positively held from rotating in either direction, to drive the internal gear 67 reversely relative to, and at substantially 3:1 reduced speed with respect to that of the driving member 10. This finds the cammed hub 73 of the individual reaction transmitting one-way clutch f to the pivotal gear 59 of the planetary gear unit d backing away from the respective pivotal gear 59 at 3:1 reduced speed relative to the speed of the driving member 10, and similarly finds the pivotal gear 63 of the planetary gear unit c allowed to manifest retrograde rotation at the same 3:1 reduced speed. By this reverse driving of the reaction shaft 14, the number of teeth of the respective pivotal gears 59 and 63, over which the planet gears of the respective planetary gear units d and c will be required to track in providing reaction for forward gear drive by these gear units d and c corresponding to a consequential abnormal speed reduction of forward drive resulting of the gear units d and c under forward drive from their associate clutches j and k. Hence, the term low speed range properly applies to the results obtained from the selected reverse drive action of the variable speed gear system h. It will be observed that the high range brake-acting selection of the gearing system h includes the overrunning brake clutch l, whereby the reaction train is allowed to overrun upon the driving member 10 being decelerated. This affords that the clutch unit g may operate in the high range, i. e., to engage upon the driving member 10 being momentarily decelerated and therefore affords that a direct drive (high speed) may be established to conclude a series of upwardly stepping speed ratios of forward drive in the high range. While in the low range selection of the gearing system h, it will be observed that the reverse reaction drive is positive. In the low range of forward speed ratios therefore, deceleration of the driving member 10 will have no effect of influencing the reaction shaft 14 to depart from its fixed reverse driven speed as rendered by the positive acting reverse drive of the gearing h. The clutch g therefore is rendered inoperable to engage while the low speed range selection is in effect. This renders the under-drive gear ratio speed, as obtained from the gear unit c, a positive (two-way drive) forward speed by which the driving member 10 (engine) may be driven from the driven transmission shaft 13 through the one-way clutch e until both the clutches j and k have engaged; and thereafter as well, but by joint action of the clutches e, j and k. So that in the low range selection, an engine-compression drive effective gear is made operable either for starting a dead engine, for descending grades against the brake effect of the engine compression or for parking the vehicle in gear against rolling forward. In either the high or low range selections, an advantage resides in the coordination of the normally engaged clutch i with the specially adapted gearing system h, whereby the latter may be neutralized in any one of its functional selections by the driver exercising his will in disengaging the clutch i. Accordingly, the engine compression gear drive of the low range, as well as the positive drive of the high speed of the high range, or the positive reverse drive may be optionally opened to allow the vehicle to freewheel, without shifting the speed range control or reverse drive adapted gearing system h out of any one of its diversely operable selections.

With reference now to the form illustrated by Fig. 2, the low range is established by shifting the master reaction unit l and the clutch member 86 forwardly, taking the clutch teeth 84 of the internal gear 67 out of engagement with the clutch teeth 82 of the one-way stop unit l and bringing the clutch teeth 85 of the planet carrier 69 into engagement with the positive clutch teeth 83, while the clutch teeth 81 of the clutch member 86 (rotatable with the internal gear 67) are carried forwardly through the lanes of the cltuch teeth 79 of the reaction shaft 14, but left in engagement with the latter. This provides the same reverse driving of the reaction shaft 14 as results of the low speed range selection of the form illustrated by Fig. 1.

*Neutral selection*

Shifting of the gear unit h, of the form illustrated by Fig. 1, or of the reaction device l and clutch member 86 of the form illustrated by Fig. 2, in either direction from the intermediate (high speed range) selection position (illustrated) only sufficiently to disengage the clutch teeth 84 from the clutch teeth 82 will render the variable speed brake gearing system h free to idle. Since every driving train of the transmission depends upon a driving connection through the gear system h for completion of driving connections between the driving and driven members 10 and 13, the transmission may be rendered neutral regardless of engagement of any of the clutches j, k or i by rendering the gear system h neutral. In the form illustrated by Fig. 2 however, by virtue of the clutch g being provided in the form of a friction type clutch, allowing the vehicle to move forwardly at sufficient speed (while the gear unit h is in neutral) would promote the centrifugal engagement of the clutch g. Providing the clutch i was left in its state of normal engagement, this engagement of clutch g would induce a forward direct drive upon the driving member 10 (engine). This effect would result of the closed circuit comprising, the engaged clutches i and g operating to connect the driven shaft 13 with the driving member 10 and connected flywheel 11 through the reaction shaft 14 and sun and planet gears 63 and 64, and the one-way clutch e operating to forward drive connect the driving member 10 with the driven shaft 13 through the internal and planet gears 62 and 64. The form illustrated by Fig. 2 therefore, provides that the engine may be started at a direct drive speed ratio by pushing the vehicle forwardly. Whereas, by the form illustrated by Fig. 1, the requirement is for the centrifugal weight 25 or jaw clutch element to enter the slot 45a to complete the direct drive connection under similar forward rotation manifestation of the vehicle movement forwardly in the driven shaft 13. The result is the same but not as smooth with the jaw clutch of Fig. 1 as with the friction clutch of Fig. 2.

*Reverse selection*

In either the form illustrated by Fig. 1 or by Fig. 2, the shiftable mechanism of gearing system *h* is shifted rearwardly, bringing the clutch teeth 81 that are rotatable with the internal gear 67 into engagement with the clutch teeth 97 of the driven shaft 13; taking the clutch teeth 84 out of the engagement illustrated with clutch teeth 82; bringing the clutch teeth 84 of the planet carrier 69 into engagement with the positive clutch teeth 83; and taking the clutch teeth 81 of the planet carrier 69 out of engagement with the clutch teeth 79 of the reaction shaft. This frees the reaction shaft 14 such that the forward drive planetary gear units *c* and *d* are rendered inoperative to transmit rotation even though their associate clutches *j* and *k* engage. The forward drive mechanism is thereby rendered neutral. While the forward drive of the driving member 10 will continue to reach the sun gear 66 of the gearing system *h* directly through the normally engaged clutch *i* and connecting clutch shaft 15. Whereupon, the planet carrier 69 being held stationary, will cause reverse transmission through the planet gears 68 to the internal gear 67 and in turn directly from the latter to the driven shaft 13 through the engaged clutch teeth 81 and 97. It will be seen that the reverse drive as established by this selection of the gearing system *h*, independently of the gear units *c* and *d*, and as completed by the normally engaged clutch *i*, constitutes a fixed gear ratio of positive (two-way) drive characteristics. The reverse drive, provided as an auxiliary to the present automatic forward speeds transmission, is utilizable therefore to park the vehicle against rolling either forward or reversely, against the engine compression as a brake.

*Series speeds operation in the high speed range*

Assuming the gearing system *h* to be driven selectively established to give its high ratio of resistance to retrograde rotative tendencies of the reaction shaft 14, as illustrated. The transmission is selected for the high speed range of forward drives. But by disengaging the clutch *i*, may be rendered neutral without disestablishing this high speed range selection, to facilitate high speed engine acceleration without incurring propulsion of the driven shaft 13, if desired.

Desiring to start the vehicle, the driver accelerates the engine, resulting in the driving member 10 and connected flywheel 11 attaining a first predetermined speed of rotation sufficient to cause the weights 33 to overcome their retractive springs 31. Provided the clutch *i* is left normally engaged, the subsequent action of the centrifugal weights 33 operating to engage the clutch *j* will clutch the internal gear 58 of the gear unit *d* only to rotate with the driving member 10, and thereby initiate a forward drive first through the gear unit *d* and therefrom through the gear unit *c* to the driven shaft 13. The gear unit *d* reacting upon its now high ratio effected pivotal sun gear 59 will deliver a fairly fast first speed reduction of this forward drive to the internal gear 62 of the gear unit *c*. The latter reacting upon its now high ratio effected pivotal sun gear 63 will deliver a fairly fast but further reduced speed of this forward drive to the load-propelling driven shaft 13. Thus, the vehicle is started from a standstill in the low speed ratio of the high forward speed range.

Upon the vehicle attaining an accelerated speed of, in the way of example, 15 m. p. hr., the weights 33 will have attained a centrifugal force capable of forcing the springs 28 to yield. As a result, the temporary bottom pressure plate 27 to the clutch unit *j* is thrust rearwardly as a secondary action of the weights 33 operating through the clutch packed elements of the clutch *j*. This rearward actuation of the plate 27 renders same an engaging presser plate acting to pack the clutch disk 34 against the main bottom pressure plate 35. Consequently, the sun gear 59, by virtue of its comparatively low circumferential tooth pitch line circle offering slight resistance even under full power, becomes coupled to rotate, together with the internal gear 58 previously coupled by the clutch *j*, with the driving member 10. The gear unit *d* thereby becomes automatically coupled to rotate as a unit under conditions, if desired, of sustained full power acceleration of the driving member 10 and consequently the load. By this locking of the gear unit *d*, leaving only the gear unit *c* gear driving, the transmission thus undergoes its first automatic change speed transition, i. e., from low to intermediate speed gear driving and effectuable under sustained power. By the present invention embodiment of the speed responsive means secondly engageable friction clutch *k* to cumulatively connect the smaller gear 59 of the two drive-adapted gears 58 and 59 of the same gear train, to be directly driven by the driving member 10 common to both gears 58 and 59, the centrifugally actuated clutch adaptation to cause a speed change transition upward under conditions of sustained power, is introduced into an entirely practical realm of practice.

The transmission thus automatically changed to drive in the intermediate speed gear of the high range, may be sustained operative in this effective acceleration gear as long or to as high a vehicle speed attainment as the driver desires by keeping the driving member 10 under sufficient acceleration to assure constant torque flow toward the driven shaft 13. Momentary deceleration of the driving member 10 will allow the speed of the driven shaft 13 to predominate over the gear unit *c*, with the result that the reaction shaft 14 and the centrifugal automatic clutch *g* rotatable therewith will be accelerated in a forward rotative direction. Consequent engagement of the clutch *g* will effect the second speed change transition of the transmission i. e., from the intermediate speed gear drive by the gear unit *c* to the direct drive high speed ratio of the high speed range resulting of the reaction shaft 14 becoming locked to rotate with the driving member 10, together with the driving elements 58 and 59 of the gear unit *d*, and with the gear 62 of the gear unit *c*. The engaged clutches *j*, *k*, *i* and *g* thus operating to lock both the gear units *d* and *c* to rotate as units whereby the driven shaft 13 is two-way drive connected to rotate with and at the same speed as the power source driving member 10. While the hitherto cooperating gear unit *h* also becomes rotatable as a unit as a consequence of the engagement of the clutch *g*. The gear unit *h* rotating, free of the stationary reaction wall 17, by virtue of release at the one-way stop brake unit *l* forming a component of the high speed range. Thus I have described the three stepped

*Optional reversion from high to intermediate speed gear*

In the high speed range, the transmission may be caused to revert from the high speed ratio established direct drive back to the intermediate speed ratio of gear drive at any time and by the special provision and arrangement embodiments of this invention, characteristically without interruption of power driving the vehicle. To accomplish this, the driver momentarily disengages the clutch $i$ with an accompanying sufficient simultaneous acceleration of the power source driving member 10. The momentarily disengaged clutch $i$ releases the body comprising the gear unit $h$, the reaction shaft 14 and the clutch $g$ all locked by the latter in rotatable unity. So that the accompanying drive, prevailing in the gear units $d$ and $c$ and consequent of the accompanying acceleration of the driving member 10, by urging retrograde rotative influence upon the reaction shaft 14, may have the desired effect of decelerating the locked gear unit $h$ until it comes to rest against the one-way stop adaptation of the brake device $l$. At some instant during the interim of this power-flow forced decelerating process of the reaction shaft 14, the centrifugal force value of the centrifugal weight element 25 of the clutch $g$ will pass under the value of the spring element 47 (in the form illustrated by Fig. 1) and of the spring element 52 (in the form illustrated by Fig. 2). Resulting in the clutch $g$ being automatically actuated retractively out of engagement. Whereupon, the clutch $h$ is allowed to return to its state of normal engagement, without effecting the reestablished intermediate speed gear ratio of drive.

Repetition of momentarily decelerating the driving member 10 (a temporary reduction in speed of drive relative to driven member) will repeat the hereinbefore described automatic transition of the transmission to the high speed ratio of drive.

*Series speeds operation in the low speeds range*

By virtue of the comparatively slower opposing force effect manifested in the reaction shaft 14 by the low range selection of the gearing system $h$, as hereinbefore described, the gear units $d$ and $c$ are rendered gear drive effective to give a greater reduction of speed in each of the respective gear driving power transmitting functions to which they are adapted. Accordingly, and assuming the vehicle to be at a standstill and the engine idling and the driving member 10 accordingly rotating slowly. With the gear unit $h$ selected in the low range, the vehicle will be initially propelled at a compound low speed ratio of drive through the transmitting efforts of the gear units $d$ and $c$ upon the driving member 10 (engine) being accelerated sufficiently to promote sufficient centrifugal force in the weights 33 to cause the engagement of the clutch $j$. Compared with the vehicle speed attainment at which the clutch $k$ would engage to supplant the initial low speed gear drive of the high speed range. Due to the lower speed ratio of the initial compound low speed ratio gear drive of this low speed range. The same driving member (engine) speed, as influenced the weights 33 to engage the clutch $k$ at 15 m. p. hr. in the high speed range, will be reached when the vehicle has attained a speed of approximately 10 m. p. hr. Hence in this low speed range, the clutch $k$ will be centrifugally engaged when the vehicle has reached the aforesaid comparatively lower speed attainment. Whereby the gear unit $d$ will become locked to rotate as a unit, leaving only the gear unit $c$ gear driving. With resultant transition of the transmission from the compound low to a compound speed reducing intermediate speed ratio of gear drive.

Since the low speed range selection establishes a positive reaction relationship between the gear unit $h$ and the stationary member 17, the reaction shaft 14 will be operating with a positive characteristic. Such that engagement of the clutch $k$ leaves the gear unit $c$ permanently gear drive operative and as such, effecting a positive (two-way) gear train between the driving member 10 and the driven shaft 13. The comparatively low intermediate forward speed ratio drive of the gear unit $c$ therefore is the highest obtainable gear ratio of the low speed range. Accordingly the vehicle becomes positive gear drive connected with the vericle engine at a speed approximating 10 m. p. hr.

However, upon the gear unit $h$ being selected for low speed range operation, the positive reaction character of influence thus placed upon the reaction shaft 14, affords that the driving member (engine) 10 will be driven at the speed ratio of the gear unit $c$ through the one-way clutch $e$ from, and whenever, the driven shaft 13 tends to rotate faster than the transmitting speed of the gear unit $c$ over that of the driving member 10, provided of course that the clutch $i$ is not disengaged such as would render the gear unit $h$ and its positive reaction transmitting effect neutral with the reaction shaft 14. Therefore, in the low speed range selection, as long as the clutch $i$ is left in normal engagement, the vehicle will be automatically established in engine compression gear whereby it will be brake effected against rolling forwardly.

Thus I have described a compact, rugged, comparatively inexpensive all mechanical combined dual range and automatic change speed transmission, utilizing the reverse drive gear system to effect different forward driving ranges of automatic changes of speeds and generally obtaining new and important results in variable speed power transmission, and constituting novel transmission means capable of effecting an unprecedented aggregation of desired operating phenomena.

I claim:

1. In a power transmission, the combination of a drive shaft representing the power source; a driven shaft adapted for coupling to the load; transmitting means for giving different speed ratios of drive from said drive shaft to said driven shaft including an epicyclic gear train associated with said driven shaft whereby two elements of said gear train will be simultaneously urged to rotate forwardly, at least one at the same speed as said driven shaft, under any tendency of the latter to rotate forwardly under the influence of the load manifesting in said driven shaft; and means for establishing a circuit of operative connections between said two forward rotatively urged elements of said gear train and said drive shaft whereby the latter would become connected to rotate forwardly at the same speed as, and under the influence of the load manifesting in said driven shaft but permitting overrun of said drive shaft in the same direction, including a one-way clutch between one of said two elements and said drive shaft forming one branch of said circuit and means including an automatic speed responsive clutch mechanism associated with the other of said two elements for establishing the other branch of said circuit therefrom to said drive shaft operable upon sufficient rotation of said other element.

2. In a power transmission, the combination with a drive shaft representing the power source and a driven transmission shaft adapted for coupling to the load; of variable speed transmitting mechanism for giving different driving ratios between the drive shaft and the driven shaft including an epicyclic gear train associated with said driven shaft and including two gear elements adapted to be simultaneously urged to rotate under any tendency of said driven shaft to rotate forwardly under the influence of the load manifesting therein, one of said two elements adapted to be supplied with an opposing force whereby the urge upon the other of said two elements would be to rotate it forwardly at increased speed relative to said driven shaft; and means for establishing a circuit of operative connections between said two gear elements and said drive shaft whereby the latter would be urged to rotate under the influence of, and at the same said increased speed as, said other gear element including a one-way clutch between said other element and said drive shaft and transmitting means operable to concurrently give an operative connection between said one of said two gear elements and said drive shaft whereby said drive shaft would rotate at increased speed relative to said one gear element.

3. In a power transmission, the combination of a drive shaft representing the power source; a driven shaft adapted for coupling to the load; transmitting means for giving different speed ratios of drive from said drive shaft to said driven shaft including an epicyclic gear train associated with said driven shaft whereby two elements of said gear train are adapted to be simultaneously urged to rotate under any tendency of said driven shaft to rotate forwardly under the influence of the load manifesting therein, and means for establishing one-way driving connections for said urge upon said elements of the epicyclic gear train from said driven shaft to culminate in an urge upon said drive shaft to rotate at increased speed relative to said driven shaft including a one-way clutch between one of said two elements and said drive shaft, said one element adapted to be rotated forwardly at increased speed relative to said driven shaft under forward rotative tendencies of the latter providing an opposing reaction force is supplied to the other of said two elements, and means for establishing and disestablishing a cooperating connection with said other element whereby the latter will render said opposing reaction force.

4. In a power transmitting mechanism, the combination with the engine shaft and flywheel and with a driven transmission shaft adapted for coupling to the load; of automatically variable change speed transmission mechanism for progressively changing the gear ratio between said shafts from certain gear ratio to a direct drive including an epicyclic gear train and an automatic speed responsive clutch mechanism adapted to lock the elements of said gear train together to establish said direct drive operable upon a temporary reduction in speed of the drive shaft relative to the driven shaft; a gear element of said epicyclic gear train adapted to be urged to rotate forwardly upon said driven shaft rotating forwardly under the influence of the load, an overrunning clutch associated with said gear element and adapted to transmit said forward rotative urge of said gear element so as to urge said drive shaft to rotate forwardly with said gear element, another element of said epicyclic gear train adapted to be urged to rotate forwardly under the same rotation of said driven shaft under said influence of the load, and said automatic speed responsive clutch mechanism operable in response to said forward rotation of said other element of the epicyclic gear train to establish an operative connection between said epicyclic gear train and said engine shaft supplemental to the function of said overrunning clutch thereby to complete a circuit of direct drive effective connections for driving said engine shaft forwardly from the forwardly rotating driven shaft at the same speed as the latter but permitting overrun of said engine shaft in the same direction at said overrunning clutch.

5. In a power transmission, the combination with a drive shaft representing the power source and a driven shaft adapted for coupling to the load; of automatically establishable gearing between said shafts for giving a speed reducing gear drive from said drive shaft to said driven shaft including an epicyclic gear train associated with said driven shaft and having two gear elements respectively adapted for individual operative connection with said drive shaft to complete a circuit of operative connections whereby said speed reducing gear drive would be established, individual transmitting means for giving a primary speed reducing operative connection from said drive shaft to one of said two gear elements including a sub-gearing in series therein for giving said primary speed reduction and an individual friction clutch mechanism also in series therein for completing the driving connections of said individual transmitting means between said drive shaft and said one gear element, means including another friction clutch mechanism for giving an individual operative connection between said drive shaft and the other of said two gear elements, resilient means normally but yieldingly engaging one of said friction clutch mechanisms and same adapted to be disengaged at the will of the operator whereby said circuit of operative connections may be disestablished at any time, and automatic speed responsive means for engaging said other friction clutch mechanism under certain conditions whereby, providing said resilient means clutch is left in engagement, said circuit of operative connections would be automatically completed; and means including a one-way clutch between the gear element of the epicyclic gear train that is associated with said automatic speed responsive means engageable clutch and said drive shaft forming means for substituting the operative connection of said automatic speed responsive clutch, when the latter is disengaged, and for joint operation with said resilient means normally engaged clutch to complete said circuit of operative connections for forward rotative manifestations of the load in said driven shaft to reach and urge said drive shaft to rotate forwardly, said gearing adapted to operate conversely under drive from said driven shaft to give an overdrive through said circuit to said drive shaft relative to said driven shaft, said resilient means engaged clutch in said circuit forming means therein for temporarily rendering the drive from the drive shaft to the driven shaft neutral over the influence of the automatic speed responsive clutch under power torque if necessary and for temporarily rendering the drive from the driven shaft to the drive shaft neutral over the influence of said one-way clutch under load torque if necessary.

6. In a power transmission mechanism, the combination of a drive shaft, a driven shaft in axial alignment and extending into close proximity to said drive shaft; a multi-speed epicyclic gearing operatively interposed and adapted to serve forward transmission between said shafts, means for completing driving connections at different of said multi-speeds of said gearing between said shafts whereby a circuit of simultaneous multi-power flow lanes will render each speed including a resilient means normally engaged friction clutch mechanism in series in one of said multi-power flow lanes adapted to normally establish one lane of said circuit and including an automatic speed responsive clutch mechanism in series in another of said multi-power flow lanes adapted normally effective to close said circuit; another epicyclic gearing associated with said resilient means normally engaged clutch and adapted contributory to said circuit of multi-power flow lanes such that said first-mentioned epicyclic gearing will depend upon cooperation from said other gearing to gear function, said other gearing adapted establishable in or out of cooperation with said first-mentioned gearing, respectively, to permanently establish the latter operative or neutral, out of cooperation with said first-mentioned gearing said other gearing adapted optionally establishable to render a reversing drive directly to said driven shaft from said drive shaft in cooperation with said resilient means normally engaged clutch, said normally engaged clutch adapted disengageable at the will of the operator either, to temporarily render the operatively established said first-mentioned gearing neutral, or to temporarily render the alternate reverse driving function of said other gearing neutral, or to facilitate selective establishments of said other gearing as aforesaid.

7. In a power transmitting mechanism, the combination of a drive member, a driven member, variable speed transmission means between said members, a plurality of epicyclic gear trains in said transmission means, said plurality of gear trains in tandem, an element of each epicyclic gear train of said plurality adapted to serve as an element to apply an opposing force as reaction to the respective gear train, a main one-way stop device adapted to operate as a brake in connection with providing a singular opposing force of reaction to said elements of all the epicyclic gear trains of said plurality, a common connecting train for supplying said opposing force and cooperating with said elements of all said epicyclic gear trains of said plurality and associated with said main one-way stop brake device, said common connecting train in positive connection with said element of certain only of said epicyclic gear trains of the plurality whereby, providing said connecting train was established to supply said opposing force in a positive manner, said certain epicyclic gear train would thereby be rendered positive gear functional for the transmission of rotative efforts in either direction, and a sub-one-way operable device connecting said element of other of the epicyclic gear trains of said plurality with said common connecting train whereby the elements of the respective train may be locked together to rotate as a unit regardless of whether said connecting train is established to provide said opposing force one-way or positive and for leaving the elements of said certain of the epicyclic gear trains of said plurality in cooperation with said common train for gear function whether the latter is established to provide said opposing force one-way or positive.

8. In a power transmission, the combination with drive and driven shafts; of variable speed transmitting mechanism between said shafts including a plurality of epicyclic gear trains in tandem all adapted for simultaneous gear function to give a low gear ratio and certain only adapted for gear function to give a second gear ratio including means for giving differential driving connections to the plurality of said gear trains from said drive shaft either to cause all to gear function for said low gear ratio or to cause only certain to gear function for said second gear ratio; a train of means common to all epicyclic gear trains of said plurality for normally supplying a one-way operative opposing force simultaneously to a certain element of each of the plurality of gear trains while said system plurality of all the epicyclic gear trains is established driven connected through other elements of same with said drive shaft for said low speed ratio gear function whereby the respective gear trains may individually gear function in impelling the load respectively thereupon, said common opposing force means including a master one-way operable mechanism adapted to serve as a one-way reaction base for effecting said opposing force and including a sub-one-way operable mechanism for individually serving said opposing force to certain only of the plurality of gear trains from said common opposing force means for enabling the elements of the respective gear train to be locked together to leave only the elements of the remainder of the plurality of gear trains served by said common opposing force means to gear function to give said second gear ratio; and means for optionally establishing said common opposing force means positively operative in character, as compared to the one-way character of influence of said master one-way operable mechanism thereover, for serving said opposing force to said remainder of the plurality of epicyclic gear trains in either direction whereby said remainder of said gear trains may be established permanently two-way drive gear functional at said second gear ratio.

9. In a change speed transmission, the combination of a driving member, a driven member, automatically variable change speed transmission mechanism for progressively changing the gear ratio between said members from low to second to a still faster speed ratio, including an automatic speed responsive clutch mechanism for establishing said still faster speed ratio operable upon a temporary reduction in speed of the driving member relative to the driven member, and superimposing control means employable at the option of the operator under torque of said drive member being constantly accelerated as an accompaniment of said employment of said supercontrol means for temorarily loosening the driving connections of said still faster speed ratio over the engaged function of said automatic speed responsive clutch for obtaining an instantaneous increase in speed of the driving member relative to the driven member under said torque such that one of said low and second gear ratios will be abnormally facilitated to assume the transmitting function from said driving member to said driven member and for incidentally conversely causing said engaged automatic speed responsive clutch to decrease in speed under the influence of said driving member increasing in speed relative to said driven member in driving the latter through the medium of one of said low and second gear ratios and to conversely obtain automatic disengagement of said automatic speed responsive clutch whereby one of said low and second gear ratios may thereby be normally reestablished the transmitting medium from said driving member to said driven member under torque and thereupon permitting the operator to relinquish employment of said superimposing control means, all under constant acceleration of said driving member, including a system of normally but yieldingly engaged friction elements adapted contributory with said automatic speed responsive clutch mechanism for the establishment of said still faster speed ratio and adapted for temporary disengagement by said operator for causing an abnormal loosening of the driving connections of said still faster speed ratio until said subsequent automatic disengagement of said automatic speed responsive clutch is accomplished.

10. In a power transmitting mechanism, the combination of a driving member; a single epicyclic gear train comprising an annulus gear element and a sun pinion gear element and planet gear elements meshing with said annulus and sun gear elements and a rotatably mounted member carrying said planet gear elements rotatably mounted thereby so that said carrying member forms the driven member to said epicyclic gear train; means for rendering one of said annulus and sun pinion gear elements rotatable with said driving member; the other of said annulus and sun pinion gears adapted to manifest retrograde rotative tendencies under the influence of forward rotative efforts applying through a rotatable embodiment of said driving member and said one gear element therewith under conditions of a resisting load factor present in said driven member; and means adapted to employ the forward rotative efforts present in said driving member to oppose said retrograde rotative tendency of said other of said annulus and sun pinion gear elements whereby the elements of the respective epicyclic gear train will be impelled under simultaneous dual power input to drive said driven member and give a speed reduction function in so doing including, a primary speed reducing gearing adapted individually driven from said driving member and adapted operative to individually drive said other of the annulus and sun gear elements from said driving member but at reduced speed relative to the latter in accompaniment to a rotatable embodiment of said one gear element with said driving member.

11. In a power transmitting mechanism, the combination as in claim 10 and including an automatic speed responsive friction clutch mechanism in series in one of said named means, respectively for individually driving one of said annulus and sun pinion gear elements of the single epicyclic gear train from said driving member, and therein adapted to complete the circuit of said dual power input connections between said driving member and the respective gear elements of the single epicyclic gear train at a juncture adapted to receive only a portion of the power by virtue of the simultaneously adapted transmitting function of the other named means, respectively for individually driving the other of said annulus and sun pinion gear elements of the single epicyclic gear train, and whereby the slip period of the speed responsive means engaging friction clutch adaptation will be greatly lessened over that of an adaptation for transmitting the full power.

12. In a power transmitting mechanism the combination as in claim 10 and including a normally but yieldingly engaged friction clutch mechanism in series in one of said named means, respectively for individually driving one of said annulus and sun pinion gear elements of the single epicyclic gear train from said driving member, and therein adapted to normally complete the driving connections of the respective individual driving means between said driving member and the respective gear element, but for disengagement at the will of the operator for disestablishing the circuit of said dual power input connections between said driving member and the respective gear elements of the single epicyclic gear train under torque if necessary over an established complete driving connection between said driving member and the other of the annulus and sun pinion gear elements.

13. In a power transmitting mechanism, the combination of a drive shaft, a driven shaft, an automatically variable transmission mechanism including planetary gearing for progressively changing the gear ratio between said shafts at least from low to second including a plurality of elements of said gearing for individual operative connection to be driven from said drive shaft first under automatic control for establishing low gear ratio and including still another adapted to be simultaneously but individually driven from, and primarily at reduced speed relative to, said drive shaft incident and contributory to both said low and said second gear ratios, means including auxiliary speed reducing gearing adapted to be individually driven from said drive shaft and operative to drive said still other element of said automatically variable planetary gearing at said reduced speed incident to either the automatically established low or second gear ratios, all whereby either the low gear ratio or the second gear ratio will be constituted of multi-power flow lanes sharing only a portion of the power transmitted with the automatic means controlling said automatically variable speed gearing, and automatic speed responsive friction clutch mechanism complementary of said automatically variable planetary gearing and functional at a power share proportioned juncture therein where a practical limit in friction clutch capacity for speed responsive energizing that is inadequate for full power transmission will provide an over capacity for transmitting said proportioned share of the power.

14. In a power transmitting mechanism, the combination of a drive shaft, a driven shaft, automatically variable change speed transmission mechanism including planetary gearing for progressively changing the gear ratio between said shafts at least from low to second including automatic speed responsive clutch mechanisms forming the automatic control over said mechanism, said planetary gearing having a certain plurality of initial drive gear elements adapted for simultaneous but individual operative connection to be driven from said drive shaft by their complete plurality of simultaneous connections solely whereby the low gear may function, said planetary gearing also having an alterant plurality of initial drive gear elements adapted for simultaneous but individual operative connection to be driven from said drive shaft by the complete plurality of their simultaneous connections solely whereby the second gear ratio may function, said automatic speed responsive clutch mechanisms functional for causing certain only of the plurality of individual connections of both the low and the second gear ratios, auxiliary transmitting means individually driven from said drive shaft including individual speed reducing gearing in series therein and adapted to drive the remainder of the respective said pluralities of drive gear elements of the planetary gearing both complementary of the low and of the second gear ratios at reduced speed relative to said drive shaft while said automatic speed responsive clutch mechanisms are otherwise causing said certain of the respective pluralities of drive gear elements to be individually driven from said drive shaft.

15. In a power transmitting mechanism the combination as in claim 14 and wherein said speed reducing gearing in series in said auxiliary transmitting means comprises individually variable gear ratio gearing adapted to be selectively established at the option of the operator operable at either of at least two different gear ratios to drive said remainder of the drive gear elements of the planetary gearing of said automatically variable change speed transmission mechanism, respectively, for sub-controlling the progressively automatically changed gear ratios to be of either a low or a higher range of gear ratios.

16. In a change speed power transmitting mechanism, the combination of a drive member, a driven member, combined automatically variable change speed transmission gearing and operator optionally selectable change speed transmission gearing each provided with individual driving mechanism from said drive member including automatic speed responsive drive connecting mechanism for the automatically variable change speed gearing and resilient means normally engaged friction clutch drive connecting mechanism disengageable at the will of the operator for the operator optionally selectable gearing, said automatically variable gearing and said operator optionally selectable gearing interoperatively establishable or disestablishable, in said interoperative establishment whereby said gearings will operate in parallel series both for gear function respectively to give speed reductions adapted to culminate in a single drive to said driven member either collectively at one forward gear ratio to said driven member or collectively at another forward gear ratio, but under one gear ratio selection or another of said operator selectable variable speed gearing whereby the collectively rendered forward gear ratios to said driven member will be of a low or a higher speed range, said operator selectable variable speed gearing adapted for selection between its various gear ratios under the facility of disengagement of said operator disengageable friction clutch, means also selectable under facility of disengagement of said friction clutch for establishing or disestablishing said automatically variable and said operator optionally selectable gearings interoperative, and means establishable and disestablishable under the facility of disengagement of said friction clutch whereby certain gearing of said combine will give a speed reducing reversing drive between said driving and driven members.

17. In a power transmitting mechanism, the combination of a drive shaft; a driven shaft; automatically variable change speed transmission mechanism for progressively changing the gear ratio between said shafts from low to second to direct drive including an automatic speed responsive clutch mechanism for establishing direct drive operable upon a temporary reduction in speed of the drive shaft relative to the driven shaft; and means for obtaining automatic reversion from direct drive to one of said low and second gear ratios under torque including a system of normally but yieldingly engaged friction elements disengageable at the will of the operator for first temporarily abnormally disestablishing the direct drive to permit an increase in speed of the drive shaft relative to the driven shaft, said disengagement to be accompanied by a constant power acceleration of the drive shaft to promote said increase in speed of the latter relative to the driven shaft, means operable under said increase in speed of the drive shaft relative to the driven shaft to cause the engaged said automatic speed responsive clutch to decrease in speed, and automatic means for disengaging the engaged said automatic speed responsive clutch operable upon the latter reaching a sufficiently low speed of rotation under said decrease in speed to thereupon permit reengagement of said friction elements to normal without reestablishing the direct drive, but for repetition of automatic reestablishment of direct drive by said automatic speed responsive clutch upon repetition of said temporary reduction in speed of the drive shaft relative to the driven shaft.

18. In a power transmitting mechanism, the combination of a drive member, a driven member adapted for coupling to the load, automatically variable change speed transmission mechanism for progressively changing the gear ratio between said members from low to second to a still faster speed ratio including an automatic speed responsive clutch mechanism for establishing said still faster speed ratio operable upon a temporary reduction in speed of the drive member relative to the driven member, a planetary gear unit of said change speed transmission mechanism having a gear element adapted to be driven forwardly under the influence of said driven member being rotated forwardly by the load, a one-way clutch between said gear element and said drive member adapted to lock said drive member to rotate with said gear element under any tendency of said gear element to rotate forwardly faster than said drive member but permitting said drive member to overrun said gear element in the same direction.

19. In a power transmitting mechanism, the combination of a drive member, a driven member, automatically operable initial drive establishing and change speed transmission mechanism between said members including a plurality of planetary gear units in tandem all gear functional to give a low gear ratio between said drive and driven members, first automatic speed responsive clutch mechanism associated directly with said drive member for establishing said low gear ratio through the medium of all said plurality of planetary gear units gear functioning operable upon an increase in speed of the drive member above idling, second automatic speed responsive clutch mechanism associated directly with said drive member for later omitting the elements of certain of said plurality of planetary gear units, that contributed gear functionally to said low gear ratio, from said gear functioning thereby for progressively stepping the transmission function up to second gear ratio, and third automatic speed responsive clutch mechanism for omitting the elements of still other of said plurality of planetary gear units from said gear functioning thereby for stepping the transmission function up to said still faster speed ratio, said third automatic speed responsive clutch mechanism operable upon a temporary reduction in speed of the drive member relative to the driven member.

20. In a power transmitting mechanism, the combination of a drive shaft, a driven shaft, automatically variable change speed transmission mechanism for progressively changing the gear ratio between the drive and driven shafts from low to second to direct drive including a plurality of epicyclic gear trains in parallel series and means including automatically operable frictionally-engaging mechanisms for establishing low and second gear ratios each whereby multi-power flow lanes will simultaneously operate respectively with separate gear elements of the system plurality of epicyclic gear trains to input divide proportions of the power of said drive shaft to said system plurality of epicyclic gear trains and whereby said divided proportions of said power will converge in said system plurality of gear trains such that the latter will gear function to give speed reducing transmission to said driven member, means for establishing direct drive automatically operable when certain conditions are attained in the mechanism, means including a normally but yieldingly engaged friction clutch adapted for disengagement at the will of the operator for establishing a permanent and positive speed reducing gear ratio between said shafts adapted to be temporarily released by disengagement of said friction clutch, and said friction clutch arranged in series with the direct drive establishing automatic means and therewith adapted to be temporarily disengaged to loosen the driving connections of the direct drive permitting an accompanying acceleration of said drive shaft to attain increased speed relative to said driven shaft thereby to instantly accomplish reversion of the transmission from direct drive to an under gear drive under torque.

21. In a power transmission, a drive shaft adapted for actuation by a prime mover to drive the load; a driven shaft adapted for coupling to the load; transmission mechanism between said shafts for driving said driven shaft from said drive shaft at either of different driving ratios including an epicyclic gear train, a one-way clutch between a gear element of said gear train and said drive shaft, and means selectively establishable, either whereby the elements of said epicyclic gear train operating under the influence of forward rotative efforts of said driven shaft will operate to drive said drive shaft at increased forward speed through the medium of said one-way clutch, or whereby a circuit of operative connections will be automatically established including said epicyclic gear train and said one-way clutch for driving said drive shaft from said driven shaft at the same speed as the latter including an automatic speed responsive clutch mechanism for establishing direct drive between said shafts operable upon said driven member rotating at sufficient speed forwardly.

22. In a power transmission mechanism, the combination of a drive member, a driven member, variable speed transmitting mechanism between said members including an epicyclic gearing unit having an element adapted for coupling to one of said members for establishment of a gear ratio drive between said members whereby said epicyclic gearing unit would gear function and having a second element adapted for coupling to the same said one of said members cumulatively with said first-named element for establishment of another speed ratio drive between said members whereby the elements of said epicyclic gearing unit would become locked together, a separate friction clutch element rotatable with each of said named elements of said epicyclic gearing unit and respectively clutchable to rotate with said one of said members, a plurality of mating friction clutch elements rotatable with said one of said members, said mating clutch elements comprising a bottom pressure plate and an intermediate plate clutchably interposing the clutch element that is rotatable with said second element of said gearing therebetween and comprising a presser plate clutchably interposing the clutch element that is rotatable with said first named element of said gearing between said presser and said intermediate plates, means normally but yieldingly urging said presser and intermediate plates apart and normally but yieldingly urging said intermediate and bottom pressure plates apart the latter at a higher resisting coefficient than that of said presser and intermediate plates, and means adapted responsive to stepped speeds of rotation by said one of said members for energizing first said presser plate toward said intermediate plate for the clutching of the clutch element interposed therebetween and for energizing later said intermediate plate toward said bottom plate for the cumulative clutching of the clutch element interposed therebetween.

23. In a power transmission mechanism the combination as in claim 22 and including still another element of said variable speed transmitting mchanism adapted for coupling to said one of said two members, including a separate friction clutch element rotatable with said still other element and disposed adjacent said bottom clutch plate, including a second presser plate also rotatable with said one of said members and interposing said last-mentioned clutch element between said second presser plate and said bottom plate, including resilient means normally energizing said second presser plate toward said bottom plate for normal clutching of the clutch element interposed therebetween, and means adapted operable at the will of the operator for retracting said second presser plate from said resilient means energized clutching state.

24. In a change speed transmission, the combination of a drive shaft, a driven shaft, automaticaly variable change speed transmission mechanism for changing the gear ratio between the drive and driven shafts from certain to a higher speed ratio including an automatic speed responsive jaw clutch mechanism for establishing said higher speed ratio operable upon a temporary reduction in speed of the drive shaft relative to the driven shaft, resilient means adapted for automatically disengaging said jaw clutch upon the engaged body of the latter reaching a predetermined low speed of rotation, and means for obtaining disengagement of said jaw clutch under the influence of said resilient means for disestablishment of said higher speed ratio under torque at the option of the operator including a normally but yieldingly engaged friction clutch in series with said jaw clutch thereby for dependency by the latter for establishment of said higher speed ratio, said friction clutch adapted for temporary disengagement at the will of the operator with accompanying acceleration of said drive shaft for conversely increasing the speed of said drive shaft relative to the driven shaft thereby for decreasing the rotation of the engaged jaw clutch to said predetermined low speed thereby to obtain said automatic disengagement of same under torque of the increasing speed of said drive shaft.

25. In a power transmitting mechanism, the combination of a driving member, a driven member, automatically variable change speed transmission mechanism for changing the gear ratio between said members from certain to a higher gear ratio including a first variable speed gearset under the automatic control of said automatically variable transmission mechanism and a one-way clutch device for taking reaction from said first gearset, a one-way stop brake mechanism remotely located with respect to said first gearset, and transmitting means including a second gearset independently selectable at either of different gear ratios forming means through the medium of the gear function of which second gearset the reaction taken by said one-way clutch from said first gearset is adapted to reach said one-way stop brake mechanism.

26. An automatically variable change speed transmission comprising, in combination, a drive shaft, a driven shaft end to end with said drive shaft, a plurality of epicyclic gear trains in tandem end to end and forming an assembly encircling a forwardly intermediate portion of said driven shaft so as the forward end gear train is enabled to drive said driven member at the latter's forward end and at a point between said assembly of gear trains and the drive shaft, an element of said forward end train in connection at said forward end to rotate with said driven shaft, a tubular shaft encompassing an intermediate portion of said driven shaft and in operative connection with a respective element of each gear train of said plurality, a clutch shaft encompassing an intermediate portion of said intermediate shaft, epicyclic gearing encircling a rearward portion of said driven shaft and adapted to be driven by said clutch shaft, said rearwardly disposed gearing adapted to be selectively established at either of two gear ratios to drive said intermediate shaft or alternatively to be established to gear drive said driven shaft directly, a reselient means normally engaged friction clutch between said drive shaft and said clutch shaft adapted for disengagement at the will of the operator, automatic speed responsive multi-clutch mechanisms of friction elements between said drive shaft and different elements of the forwardly disposed said plurality of epicyclic gear trains for progressively coupling certain of said different elements to rotate with said drive shaft thereby to establish low gear ratio and certain additional of said different elements to rotate with said drive shaft thereby to establish second gear ratio, and means for coupling certain additional of the elements of said forwardly disposed plurality of epicyclic gear trains to rotate with said drive shaft thereby to establish direct drive between said drive and driven shafts including an automatic speed responsive clutch mechanism in series with said resilient means normally engaged friction clutch and operable upon a temporary reduction in speed of the drive shaft relative to the driven shaft.

27. An automatically variable change speed transmission mechanism operating between and including a driving member and a driven member having mechanism for initally giving a speed reducing gear drive from said driving member to said driven member including a parallel series multiplicity of epicyclic gear trains forming a variable speed differential planetary gear mechanism having a multiplicity of normally independently rotatable primary input gear members respectively of different epicyclic gear trains, with first operable means to simultaneously take multi-lanes of parallel power flow immediately from said driving member as simultaneous but separate driving connections between said driving member and different of a plurality of said multiplicity of primary input gear members thereby to establish said initial speed reducing gear drive between said driving and driven members including automatic drive coupling mechanism for establishing said initial gear drive automatically operable to gradually reduce relative rotation between said driving member and certain at least of said plurality of primary input gear members in accordance with the speed of said driving member and the load manifesting in the associate of said primary input gear members; and subsequently operable means for successively establishing a faster driving ratio between said driving and driven members also whereby a multiplicity including additional of said normally independently rotatable gear members of said parallel series differential planetary gear mechanism will be simultaneously but separately driven from said driving member by parallel power flow lanes each emanating immediately at said driving member including another drive coupling mechanism for establishing said faster driving ratio automatically operable, to gradually reduce relative rotation between said driving member and certain at least of said primary input gear members, when certain conditions are attained in the mechanism.

EVERETT R. BURTNETT.